US012715805B2

(12) United States Patent
Dehkordi et al.

(10) Patent No.: US 12,715,805 B2
(45) Date of Patent: Aug. 25, 2026

(54) METHODS AND SYSTEMS FOR COMPUTATIONAL PRECISION THREE-DIMENSIONAL FORMING VIA LOCALIZED STRESS REMAPPING

(71) Applicant: Brelyon, Inc., San Mateo, CA (US)

(72) Inventors: Barmak Heshmat Dehkordi, San Mateo, CA (US); Christopher Barsi, Lee, NH (US); Albert Redo Sanchez, San Mateo, CA (US)

(73) Assignee: BRELYON INC., San Mateo, CA (US)

( * ) Notice: Subject to any disclaimer, the term of this patent is extended or adjusted under 35 U.S.C. 154(b) by 335 days.

(21) Appl. No.: 18/344,830

(22) Filed: Jun. 29, 2023

(65) Prior Publication Data

US 2024/0043308 A1 Feb. 8, 2024

Related U.S. Application Data

(60) Provisional application No. 63/370,552, filed on Aug. 5, 2022.

(51) Int. Cl.

*C03B 23/00* (2006.01)
*C03B 23/023* (2006.01)
*C03B 23/025* (2006.01)
*G05B 13/04* (2006.01)

(52) U.S. Cl.

CPC ...... *C03B 23/0086* (2013.01); *C03B 23/0235* (2013.01); *C03B 23/0258* (2013.01); *G05B 13/041* (2013.01)

(58) Field of Classification Search

None

See application file for complete search history.

(56) References Cited

U.S. PATENT DOCUMENTS 4,943,150 A * 7/1990 Deichert ................. B29C 35/08 264/2.6
5,693,268 A * 12/1997 Widman ............. B29C 37/0003 264/1.36
7,000,430 B1 * 2/2006 Fotheringham ..... C03B 23/0258 65/273
2012/0206796 A1 * 8/2012 Gibson ............ B29D 11/00355 65/102
2013/0012842 A1 * 1/2013 Barthe ..................... A61N 7/02 601/3
2013/0298608 A1 * 11/2013 Langsdorf ............. C03B 23/035 65/106
2016/0145139 A1 * 5/2016 Fredholm ............... C03B 25/08 65/271
2019/0352209 A1 * 11/2019 Iga ........................ C03B 17/067

(Continued)

FOREIGN PATENT DOCUMENTS

FR 943974 A * 3/1947

OTHER PUBLICATIONS

FR-943974-A EPO Machine Translation retrieved Sep. 16, 2025. (Year: 2025).*

*Primary Examiner* — Lisa L Herring

(74) *Attorney, Agent, or Firm* — Hsuanyeh Law Group, PC

(57) ABSTRACT

A manufacturing process for realizing increased precision in forming elements using computational masks. Some embodiments include a thermal source that may be computationally patterned, and a subsystem coupled to the course, the subsystem comprising an element that may be computationally patterned.

4 Claims, 11 Drawing Sheets

(56) References Cited

U.S. PATENT DOCUMENTS

| | | | | |
|---|---|---|---|---|
| 2020/0110207 | A1* | 4/2020 | Banaei | G02B 1/115 |
| 2020/0325059 | A1* | 10/2020 | Brennan | C03B 23/0307 |
| 2023/0143337 | A1* | 5/2023 | Katzman | B29C 51/46<br>264/544 |
| 2024/0217858 | A1* | 7/2024 | Dannoux | C03B 23/0357 |
| 2025/0243102 | A1* | 7/2025 | Takahashi | C03B 23/0307 |

* cited by examiner

45 IR beam
6
1
2
11

3
1
11
2
FIG. 7D1
46 Addressable thermoelectric radiators
1
11
2

3
1
11
2
FIG. 7D2
47 Multilayer computational slab
1
1
2
2
FIG. 7C1
1
10
11

47 Multilayer computational slab
FIG. 7C2
12
10
12
10
2

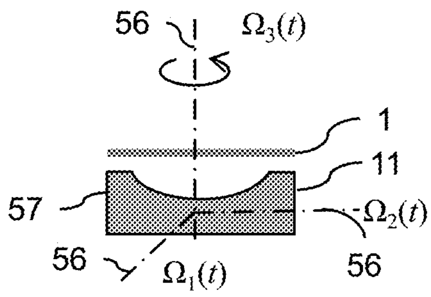
FIG. 11A
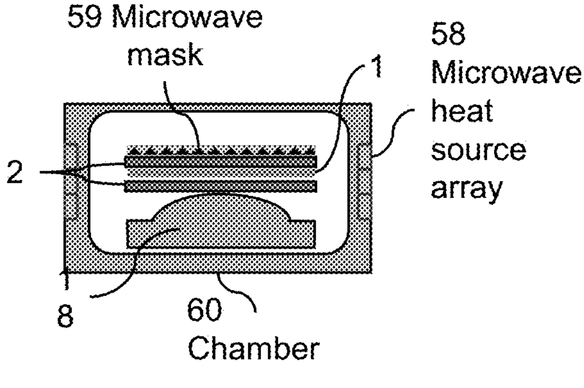
FIG. 11B
62 Tension applied
1
61 Tension wires
Top view
FIG. 11C

METHODS AND SYSTEMS FOR COMPUTATIONAL PRECISION THREE-DIMENSIONAL FORMING VIA LOCALIZED STRESS REMAPPING

RELATED APPLICATION

This application claims priority under 35 U.S.C. § 119(e) to U.S. provisional patent application, U.S. Ser. No. 63/370,552, filed Aug. 5, 2022, which is herein incorporated by reference in its entirety for all purposes.

FIELD OF THE INVENTION

The present invention relates generally to three-dimensional precision glass forming, and more specifically to the introduction of computational methods and mechanisms to remap, predict, or influence localized stresses and forces during fabrication in order to increase the forming precision to optical precision and eliminate unwanted surface deviations during conventional lower-resolution forming methods.

BACKGROUND OF THE INVENTION

Manufacturing of optical components requires precision geometric shaping such that surfaces are smooth on scales on the order of a fraction of wavelength of the radiation for which it is designed. Further, the volume of the material must have homogeneous optical properties, such as refractive index. Engineering precision, scalability, time, and cost are all constraints that must be balanced by the desired application specifications.

SUMMARY OF THE INVENTION

Optical grinding and diamond turning are ultraprecise machining methods and produce optical precision on the order of one tenth to one fiftieth of a wavelength, but they are slow and costly, especially for large-scale optical elements. Instead, thermoforming involves heating the optic above the glass transition temperature such that it becomes viscoelastic, pressing it into a manufactured mold, and then cooling the glass. It is a more cost-effective and quicker method, involving time scales on the order of an hour. Thermoforming, however, suffers during all three stages by localized variations in temperature and residual stresses in the optic element and systematic changes in geometry and refractive index, and they both exacerbate inhomogeneities in the material. Surface precision is on the order of half of one wavelength. Computational techniques for alleviating distortions in physical systems can alleviate fabrication errors, correct aberrations, and produce a higher-quality product.

In this disclosure, we describe a set of methods and embodiments for applying computational techniques to the thermoforming process to compensate temperature and force variations in the material so as to eliminate local stresses. The result is a set of manufacturing embodiments that have the cost- and time-effect benefits of thermal forming and the optical precision of machining methods. This disclosure starts with a description of the elements and smaller sub-systems used in the different embodiments of the invention to create a glossary. A description of the five main architectures follows: methods using high-precision programmable heating sources, non-contact radiative methods using a computational mask with a mold, methods in which a computational mask contacts the target optic for stress- and heat-based modulation as it is pressed into a mold, methods in which mask contacts a target with a mold to produce computational bulging or sagging, and methods in which the mold itself comprises computational masks or modifications that are transferred to the target optic during the molding process. A system-configuration block diagram representations describes the mapping approach for both actuating and sensing applications of such methods. Next, embodiment trees or sub-embodiments for each of these five categories provide further detail, modifications, and alternate implementations of the architectures disclosed here. Some analysis about the optimization problem for generating computational masks is presented, as is a set of auxiliary embodiments for rotational platforms, microwave sources, and tension-based masks.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 7A through 7F illustrates a set of side views of example embodiments of contact-based computational masking with a mold, as described in FIG. 3C.

FIGS. 11A through 11C illustrate some auxiliary embodiments of various inventions, including rotational platforms, microwave sources, and tension-based masks.

DETAILED DESCRIPTION OF THE INVENTION

Figure 1:
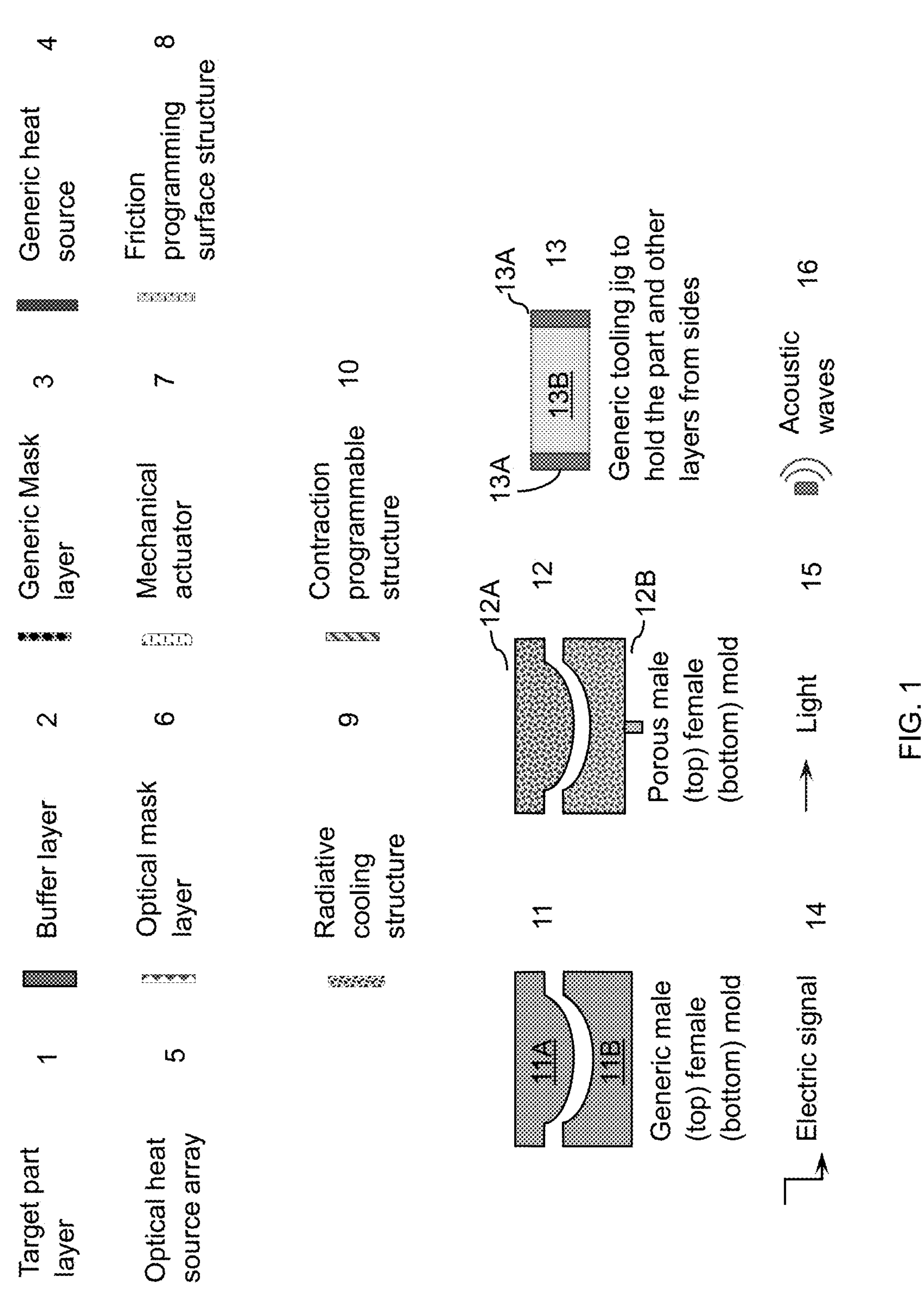
FIG. 1 illustrates the set of elements that compose the various embodiments of compression forming and computational stress remapping described in this disclosure.

In this description, references to an "embodiment," "one embodiment" or similar words or phrases mean that the feature, function, structure, or characteristic being described is an example of the technique or invention introduced here. Occurrences of such phrases in this specification do not necessarily all refer to the same embodiment. On the other hand, the embodiments referred to herein also are not necessarily mutually exclusive.

All illustrations, drawings, and examples in this disclosure describe selected versions of the techniques introduced here and are not intended to limit the scope of the techniques introduced here. All references to "user" or "users" pertain to either individual or individuals who would utilize the technique introduced here.

Nomenclature

All illustrations and drawings describe selected versions of the present invention and are not intended to limit the scope of the present invention. Additionally, throughout this disclosure, the term arbitrarily engineered refers to being of any shape, size, material, feature, type or kind, orientation, location, quantity, components, and arrangements of components with a single or array of components that would allow the present invention or that specific component to fulfill the objectives and intents of the present invention or that specific component within the invention.

The terms programmed or computationally preprogrammed or precomputed mean that a desired pattern is determined by a computer program and then imprinted onto an element. For example, the computer program can be an iterative program that minimizes a cost function, or it can be an inverse algorithm.

A mask is an element of the system whose properties across its dimensions are varied or patterned in a computationally preprogrammed way to remap, predict, or influence local variations of other elements in an embodiment.

All such components can be arbitrarily engineered to deliver the desired profile. As used herein, arbitrary parameter variation refers to variations, changes, modulations, programing, and/or control of parameters, which can include one or a plurality of the following variations: source and sink temperatures variation, array and mask resolution or periodicity, temperature cycle time, or absorptivity or emissivity of a component.

Throughout this disclosure, the terms active design, active components, or, generally, active refer to a design or component that has variable thermal properties that can be changed with an optical, electrical, magnetic, radiative, or tensile signal.

The term thermally coupled refers to one element being adapted to impart, transfer, feed, or direct heat flow into to another element directly or indirectly.

The term thermoforming relates to any forming that uses temperature change to form materials. This includes hot forming, thermal forming, heat bending, etc.

The term 3D forming relates to any type of forming such as 3D surface forming, 3D shaping, 2D bending, 2D forming, embossing, imprinting, etc.

The oven comprises the heating mechanism and the housing in which these processes take place. The oven can be arbitrarily engineered. It can be a resistive heat oven; or it can be a gas oven; or it can be an acoustic-, magnetic-, microwave-, optical-, or plasma-based oven. The oven could have an arbitrary set of sensors in an arbitrary configuration.

In this disclosure, optical precision refers to precision that is comparable to wavelength of the optical radiation for which the manufacturing products are intended. For visible light, the typical precisions range from on the order of a few angstroms to 10s of microns, depending on specific application. Optical precision is usually 10 to 1000 times higher than what a conventional hot forming method can provide, which is on the order of 10s to 1000s of microns.

The techniques disclosed here offer new modalities in order to improve the precision of thermoforming methods. For example, in some embodiments, the components of the thermoforming mechanisms are themselves dynamically modified in a precomputed way to reduce geometric and refractive errors in the resulting optic to within optical precision.

The elements of the embodiments for this invention are shown in FIG. 1. The components can be engineered arbitrarily. Element 1 is the target part layer that is to be formed. It can be a glass material, or it can be a polymer, or polymer on glass. The glass can also be doped with chalcogen materials to enhance the desired properties of the final optic.

Element 2 is a buffer layer. The buffer layer can act as a support or a protection mechanism for the target part layer, or it can interact with the target part layer. It can be arbitrarily engineered in material and in its geometry.

Element 3 is a generic mask layer. This layer serves to transfer a computationally determined pattern to the target part layer to modify or influence the stress or temperature profiles of the target part layer. It can be arbitrarily engineered in material and geometry. For example, the mask can be a metallic material, or it can be ceramic, or it can be a resin, or it can be a three-dimensionally printed layer. The mask layer can transfer a pattern radiatively, or through direct contact with the target part layer, or through intermediary elements.

Element 4 is a generic heat source. It can be composed of one element or a plurality of elements that are turned on and off cohesively. The heating mechanism can be arbitrarily engineered.

Element 5 is an optical heat source array. This element provides a heating mechanism for the invention using optical radiation, which includes infrared (IR) radiation. It can be arbitrarily engineered. The elements can be individually addressed to switch on or off or to vary their output power continuously.

Element 6 is an optical mask layer. This element interacts with optical sources and transfers a computationally determined pattern to the target part layer.

Element 7 is a mechanical actuator. It varies the position or the orientation of the components to which it is attached through motion.

Element 8 is a friction programming surface structure. This element can be arbitrarily engineered. Across the dimensions of this element the friction force varies in an arbitrarily engineered way. The element could use dry friction or wet friction.

Element 9 is a radiative cooling structure. This element is arbitrarily engineered with a mechanism to locally cool nearby components. It can be a metallic material with corrugations or fins, for example.

Element 10 is a contraction programming structure and is preprogrammed such that local contact forces between it and other elements, or between different parts of itself, vary dynamically to influence the stress profile of the elements in the system.

Element 11 is a generic male 11A and female 11B mold. After heating, the target part layer is pressed against either part individually, or both together, to obtain a shape that is designed on the mold. The mold, for example, can be metal, or it can be silicon, or it can be glass. It can be arbitrarily engineered.

Element 12 is a porous male 11A and female 11B mold. The porous molds can be made of graphite. The target part layer is pressed against this element to form it, and the porosity allows for extracting air to create a vacuum. It can also be used to insert inert gases to serve as protection for the part layer.

Element 13 is a generic tooling jig to hold the part and other layers from the sides 13A or edges. The central region 13B of this element is empty and the target part layer is influenced by non-contact forces.

Element 14 is an electric signal that is used in an electrical system that accompanies the oven to modulate the elements, or provide feedback to a computer, or provide user input.

Element 15 is a light ray. The light can serve as a signal mechanism for the different elements of the system to interact with each other, or it can serve as a heating mechanism in optically heated ovens.

Element 16 is a source of acoustic waves. The acoustic wave can be a localized source, or it can be an array of such sources, or it can be an extended source. The acoustic waves modulate the pressure inside the components and in air gaps between them.

Figure 2:
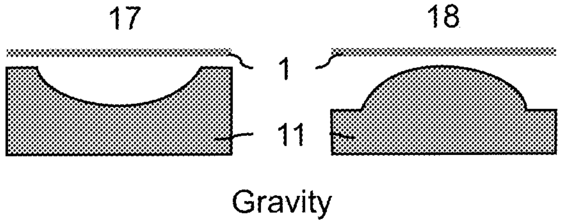
FIG. 2 illustrates various forming modalities of compression forming.
Figure 2:
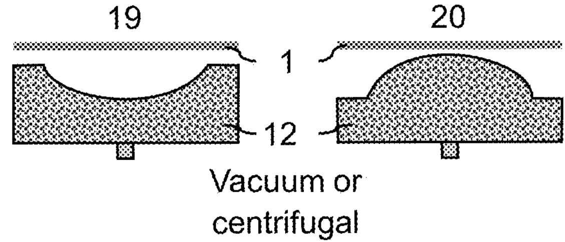
Figure 2:
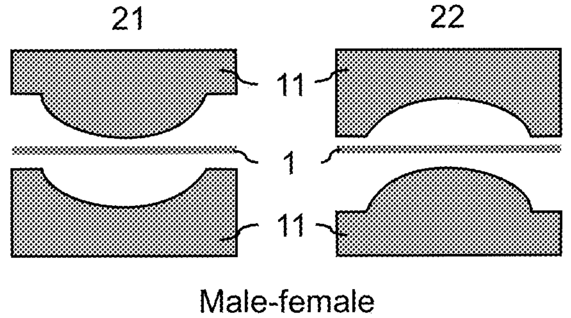
Figure 2:

FIG. 2 illustrates a set of common forming modalities that will serve as a basic starting point for the methods disclosed here. Element 17 is a gravity-based forming system using a female mold. The target part layer sags into the mold due to the force of gravity. Element 18 is a gravity-based forming system using a male mold.

Element 19 is a vacuum- or centrifugal-based forming system using a porous female mold. In a vacuum-based forming method, air is purged between the target part layer and the mold so that pressure differences on either side of the target part layer cause it to be shaped. In a centrifugal-based method, the mold and target part layer are spun around a vertical axis in the plane of the page and experience radial tensile stresses to form the part. Element 20 is a vacuum- or centrifugal-based forming system using a porous male mold.

Element 21 is a male/female-force-based forming method. As the male and female molds are pressed together, the target part layer experiences forces and deforms according to the molds.

Element 22 is a female/male-force-based forming method.

Element 23 is a non-contact-based forming method. The target part layer is supported by a jig at only its edges. There is no mold, and the target part layer is formed by sagging under the influence of gravity or by experiencing pressure differences.

Figure 3C:
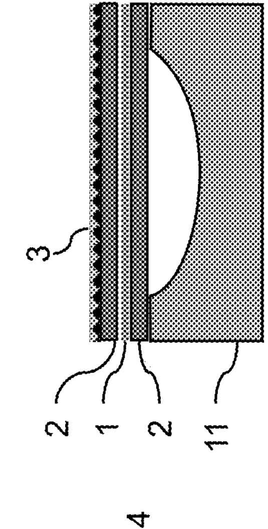
FIGS. 3A through 3E illustrate example embodiments for the present invention using precision programmable heating sources, non-contact computational masks with a mold, contact-based mask with a mold, contact-based masks without a mold, and computational mold modulation.
Figure 3C:
Figure 3E:
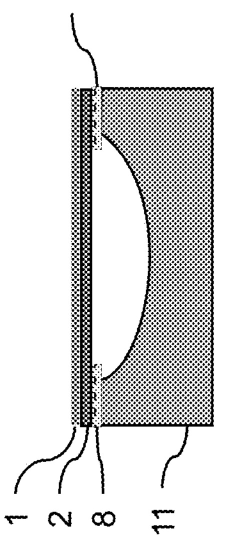
Figure 3B:
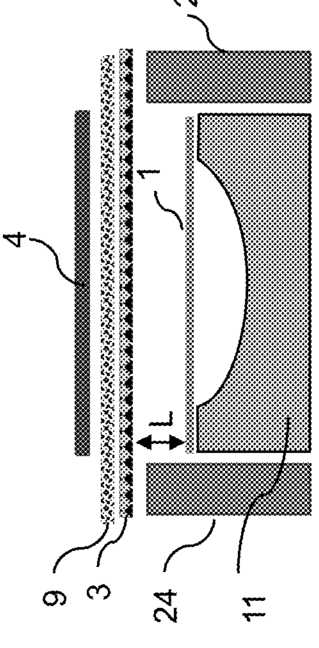
Figure 3D:
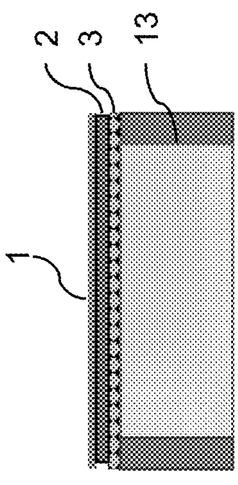
Figure 3A:
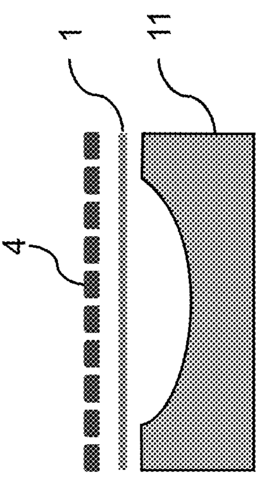

FIGS. 3A through 3E depict a set of example embodiments that represent five different architectures to remap localized stresses computationally. FIG. 3A illustrates a prototype embodiment in which the oven comprises a mold 11 with an array of heating sources (4) that are addressable or programmable via a precomputed mask. The heating mechanism can be optical, or it can be electronic, or it can be vibrational, or it can be a resistor array, or a microwave source. The array can dynamically evolve. The heating mechanisms can be arbitrarily engineered, and they could be modulated during any part of the thermal cycle of the molding process. The mask signal can be temporal or spatial. The precomputed temperature distribution is then thermally transferred to the target part layer 1 to which it is thermally coupled.

FIG. 3B illustrates an embodiment of thermoforming that is based on non-contact-based computational masks. Here, a target part layer 1 is pressed into a mold 11. A generic mask layer 3 is supported by a gapped jig 24 such that it maintains a distance L from the target part layer 1. A heating source 4 heats the mask 11, which obtains a precomputed temperature distribution that is thermally transferred to the target part layer 1. A second masking layer can be a structured layer that performs radiative cooling 9 in a precomputed way, or the system can have only the radiative cooling layer 9. The mask can be implemented by etching corrugations into a material, or it can be milled. As this mask heats, the corrugations or etchings are designed to create localized temperature fields that get transferred radiatively to the target part layer 1. The mechanism can work during the cooling phase or during the heating phase. It could direct heat toward the optic via reflective heat concentration, or it can reflect heat away via radiative cooling in a computationally designed manner. The mask material could be an optical mask if the heat source is optic, or it can be a ceramic material with a variable heat capacity, or it can be metallic with grooves carved into it. The mask is preferably two-dimensional, but it could be a three-dimensional mask, such as a metal that is milled and embedded in a transparent material.

The embodiment in FIG. 3C demonstrates an approach using a contact-based mask. The target part layer 1 has a first buffer layer 2 on top of it and a second buffer layer 2 below it for surface protection. The buffer below could be sand-blasted to create a smooth surface. On top of the first buffer layer 2 is a generic mask 3 that is optimized such that as the target optic 1 is heating, the weight and heat profiles vary across it and the stress profile in the target part layer 1 is consequently modified. The mask can be glass in some instances, or it can be plastic, or it can be silicone. After the target part layer 1 is molded, the masks and buffers are discarded. In some embodiments, only a single buffer layer is used.

In FIG. 3D, the embodiment has no molding tool, but the target part layer 1 is supported along its edge by a jig 13. In between the target part layer 1 and the jig 13 are a buffer layer 2 and a generic mask 3. Normally, this implementation uses sag due to the gravitational force or pressure differences and blow forming as the target part layer 1 is heated. It is, therefore, limited in controllability. In the current embodiment, the mask pattern is calculated using stress analysis so that the target part layer 1 sags in a way that is influenced or determined by the computed mask pattern. The mask can be acrylic with laser carvings, for example. After the thermal cycle is finished, the target part layer 1 is molded into the desired shape, and the buffer 2 and generic mask 3 are also deformed.

In some embodiments, the size of the target optic can be smaller than the buffer layer to avoid edge artifacts, or the jig itself can be bigger. In embodiments that use a mold, edge artifacts also can be avoided with a larger buffer layer. The margins of the target optic consequently remain useful for the desired application and trimming of the target optic is not necessary. In some embodiments, the mask can evolve in time during the process. The mask might be composed of multiple layers, each layer having a profile such that during the process, the friction and contact forces vary in a desired way in time. In some embodiments, there could be a plurality of masks stacked on top of each other. During the thermal cycle, the mask layers contract or expand and consequently come into stronger or weaker contact with each other over time to generate friction or stress profiles or to create a certain form that is transferred to the target part layer.

The embodiment in FIG. 3E modifies the mold 11, which itself is computationally modulated in a desired way. The mold 11 has a precomputed friction structure 8 around the edge such that as the target part layer 1 is being molded, the friction and stresses vary between the mold and the optic in a pre-defined way. A buffer layer 2 provides support to the target part layer 1. The friction layer 8 could be a three-dimensionally printed resin. In some embodiments, the precomputed elements could interact with male and female molds in a desired way.

Figure 4:
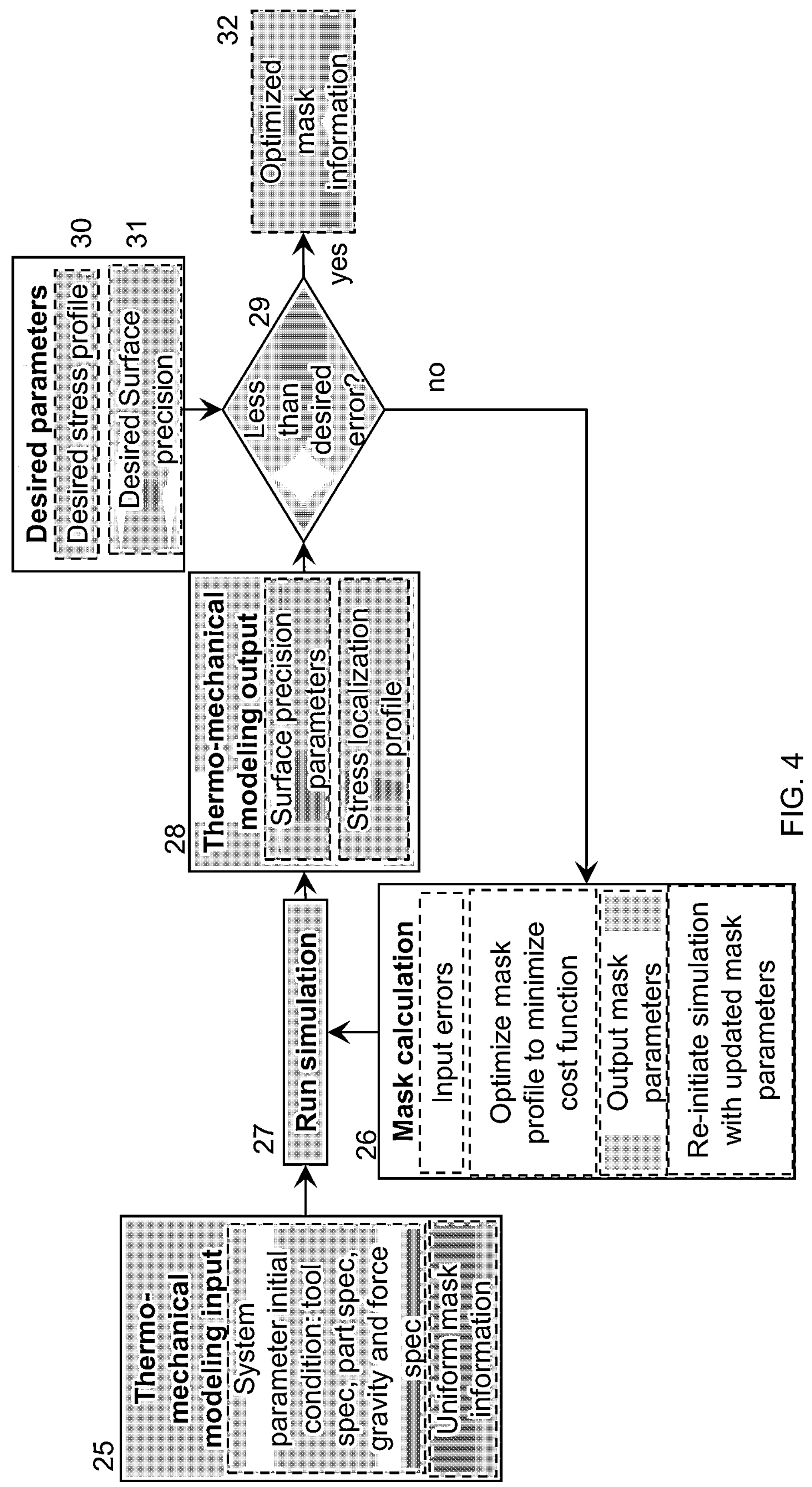
FIG. 4. illustrates a block-diagram representation of the processes that take thermo-mechanical input information, compute desired masking profiles and stress profiles, and compare with the desired specifications.

FIG. 4 depicts a block diagram of the computational remapping process. Realizing a given embodiment with computational masks starts with thermo-mechanical modeling input parameters 25, including the specifications for the tools and for the desired final part, properties about mask materials, and specifications of the underlying force mechanisms. Properties about mask variation could be initialized in a mask calculation 26, and both the mask calculation and thermo-mechanical modeling data are input into a simulation 27. The result of the simulation is thermo-mechanical output information 28, including the precision parameters of the surface layers and stress and temperature profiles of the system components. This information is compared 29 to the desired parameters and specifications 30 for the stress profile and surface precision. If the thermo-mechanical output information is not within the required tolerances, it is input into a recalculation of the mask properties optimized to minimize a cost function 26 between the desired specifications and any constraints on the system. The simulation iterates in this way until the desired precision is achieved. The optimized properties of the mask profiles 32 are output to the user, and then manufacturing of the mask and other tools takes place.

Figures 5A, 5B:
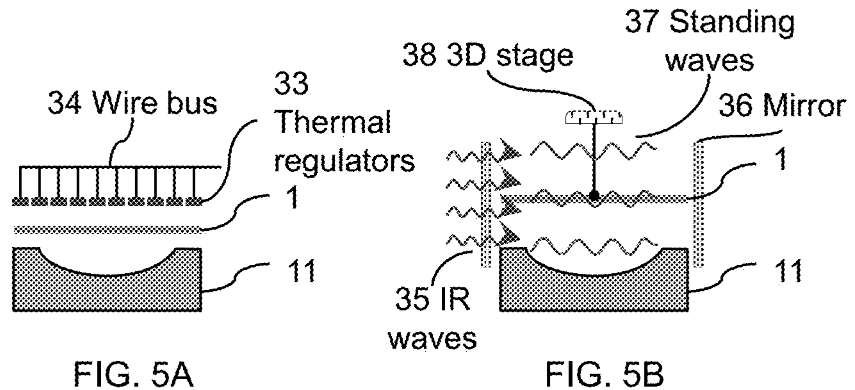
FIGS. 5A and 5B illustrate a set of side views of example embodiments using precision programmable ovens, based on FIG. 3A, in multiple configurations and with various elements.

FIGS. 5A and 5B illustrate a pair of embodiments in which the computational masking occurs within a precision or programmable oven. These are alternative embodiments to that in FIG. 3A. In the embodiment in FIG. 5A, the heating element comprises an array of electrically controlled active elements 33. Each element is a solid-state material with a switchable conductance that undergoes a phase change based on an applied electric voltage via a wire bus 34 and, consequently, acts as a thermal regulator. The elements could be polymer nanorods that undergo morphological phase changes. Heat flow from a heating element is then regulated locally in a preprogrammed fashion that is transferred to the target element 1 and mold 11.

FIG. 5B depicts an embodiment in which the heat source is an optical IR beam 35 that is injected into the target part layer 1 and mold 11 transversely. Partially reflecting mirrors 36 produce standing wave patterns 37 of the IR radiation, and the standing wave pattern acts as a three-dimensional thermal mask. The IR beam could comprise an array such that each element is modulated in intensity or phase. A 3D stage 38 varies the position of the target part layer 1 and mold 11 to orient them in a programmed way in the standing wave pattern.

Figures 6A, 6B, 6C:
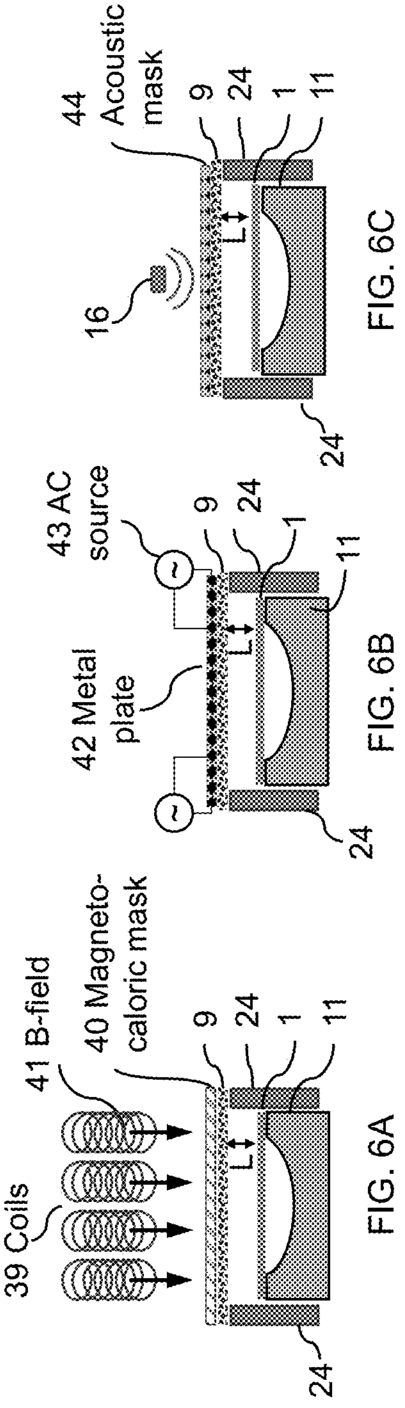
FIG. 6A through 6C illustrate a set of side views of example embodiments to produce non-contact masks with a mold, as in FIG. 3B.

FIGS. 6A through 6C illustrate a set of embodiments in which the system includes a mold and a computational mask that is not in direct contact with the target part layer. These embodiments are examples of or alternative implementations to FIG. 3B. In the embodiment in FIG. 6A, a magnetic field produced by a set of coils 39 sets up a magnetic field 41 against a magneto-caloric mask layer 40. The mask layer can be a set of gadolinium (Gd) cells or some other magneto-caloric material. A radiative cooling mask (9) could also be included. The pattern is computed so that different spots experience different heating, which radiates locally to the target part layer 1, which lies a distance L from the masks. The masks themselves are supported by an external gapped jig 24, and the target part layer 1 is pressed into the mold 11.

In the embodiment in FIG. 6B, the mask layer is itself a unform metallic sheet 42 with electrodes connected to set of AC electrical sources 43. The sources are programmed to produce standing current waves in the metal layer, and the antinodes of the standing waves correspond to locations of high current and therefore strong heating. The locally varying heating is then radiated to the nearby target part layer 1, a distance L away, which is pressed into a mold 11. The metal plate 42 is supported by an external gapped jig 24. An additional radiative cooling layer 9 could be included to further engineer the heat profile.

FIG. 6C depicts an embodiment in which an acoustic source 16 impinges on an acoustic mask 44. The mask could be a 3D printed material with surface corrugations or varying density to modulate the concentration of the acoustic waves, which then cause the structure to heat up and thermally transfer a precomputed temperature profile to a target part layer 1, which is pressed into a mold 11. A radiative cooling layer 9 could be included as an extra layer for further thermal engineering. The masking layers are supported by an external jig 24 such that they are positioned a distance L from the target part layer 1.

Figures 7A, 7B, 7E, 7F:
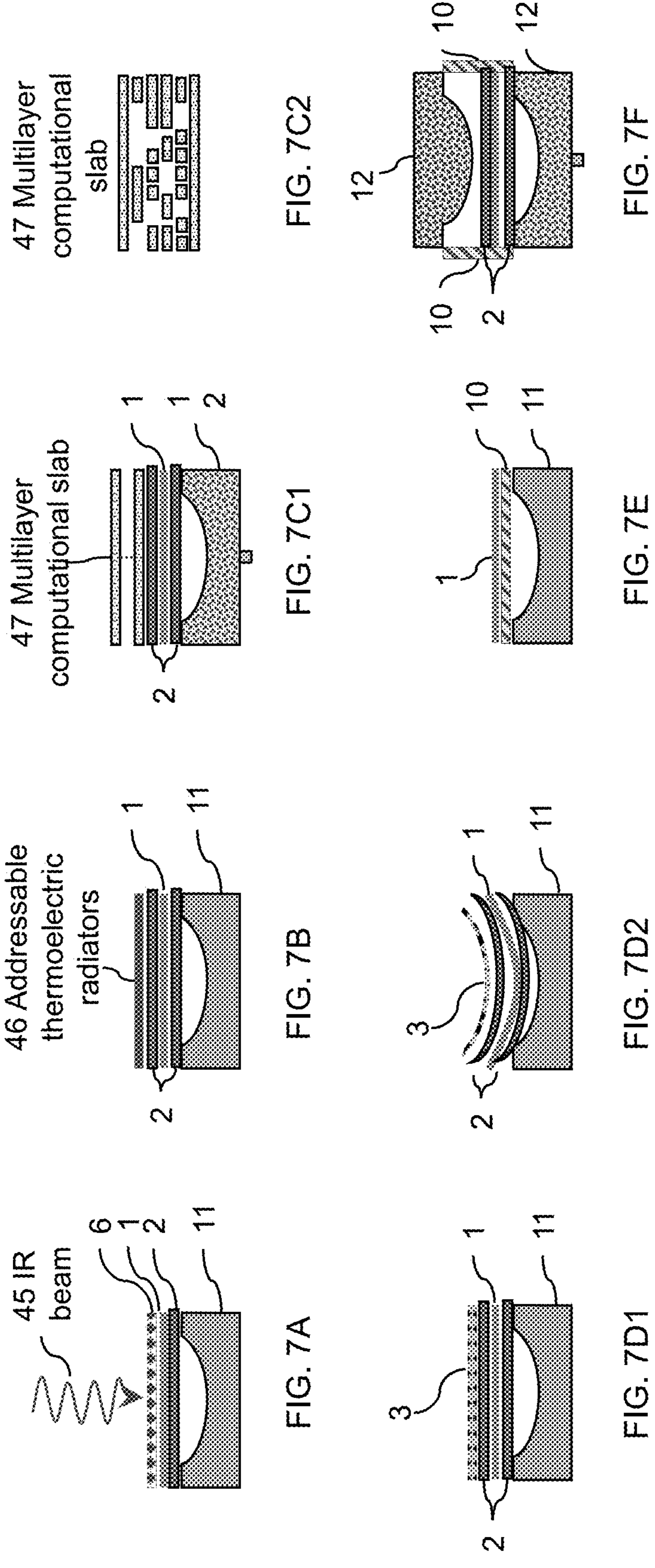

FIGS. 7A through 7F depict a set of embodiments in which the target part layer is in contact with the mask as it interacts with the mold. These are alternative embodiments to or examples of that in FIG. 3C. FIG. 7A depicts an embodiment in which an IR heat source 45 strikes an optical mask 6 with a locally varying absorptive strength. The local variation is preprogrammed such that the local absorption causes local temperature changes. These changes can be thermally transferred to the thermally coupled target part layer 1 and mold 11, or the temperature changes can change the local mechanical properties of the mask layer to induce local stress and strain fluctuations on the target part layer 1 that touches it. A buffer layer 2 can absorb residual IR radiation and act as a second mask.

In the embodiment in FIG. 7B, the mask layer is an electrically addressable array of elements 46. The elements act as solid-state thermo-electric sources. They could consist of graphene with platinum electrodes. The local temperature changes are transferred to the target part layer 1 it touches and to the mold 11. A buffer layer 2 can be included either above the target part layer 1 or between the target part layer 1 and mold 11 for support and protection, or there can be two such buffer layers 2 simultaneously.

In the embodiment in FIG. 7C1, the mask layer itself has multiple layers, as a multilayer computational slab 47, such that it can evolve dynamically. This multilayer computational slab 47 is stacked on top of a buffer layer 2 which protects the underlying target part layer 1. A second buffer layer lies between a porous mold 12 and the target part layer 1 for support. In some embodiments one of the two buffers is used, or neither is used. The structure of the multilayer computational slab is shown in FIG. 7C2, and the variation could be molecular scaled, for example, with multiple layers of graphene to vary the adhesion to the target part layer in a precomputed way. The multilayer computational slab 47 could be micron-scaled and be etched from a volume. Each layer has a profile such that during the process, the friction and contact forces vary in a desired way in time. During the thermal cycle, the layers contract or expand and consequently come into stronger or weaker contact with each other over time to generate a friction or stress profile or to create a certain form that is transferred to the target part layer.

The embodiment in FIG. 7D1 is similar to that in FIG. 3C: two buffer layers 2 have in between them the target part layer 1. On top of the top buffer layer 2 is a generic mask 3 that locally adjusts the heat or stress profile of the target part layer 1 as it is pressed into the mold 11. Note that in some embodiments, a single buffer layer may be used. FIG. 7D2 depicts the system of FIG. 7D1 after the thermal cycle is complete. The generic mask 3, buffer layers 2, and target part layer 1 are all molded, and the used mask 3 and buffer layers 2 are discarded.

In the embodiment in FIG. 7E, a target part layer 1 is stacked on top of a contraction programmable structure 10 that is preprogrammed to expand or contract during the heating process. As the parts are pressed into the mold 11, the varying contraction and contact forces induce variable, precomputed, stresses and heating in the target part layer 1. Another example of such an implementation is shown in the embodiment in FIG. 7F. Here, a target part layer 1 is sandwiched in between two buffer layers 2. In some embodiments, only a single buffer layer 2 is used. Both male and female porous molds 12 are used to form the part. Contraction programmable structures 10 are included in between the two molds such that they control the local forces and stresses by the molds 12 on the target part layer 1.

FIGS. 8A through 8D depict a set of embodiments as extensions and examples of that in FIG. 3D, in which there is no mold, the target part layer is supported at the edges by a jig, and the mask remains in contact with the target part layer. In the embodiment in FIG. 8A, the target part layer 1 rests on top of an extended buffer layer 2 that is supported by a jig 13. This layer extends beyond the size of the jig itself. Air is purged in the system, but there is a mask 3 through which the air flows. The mask has precomputed channels that modulate the air flow and the local pressure difference against the buffer layer and sample. The result is a modulated stress or pressure profile through the target part layer 1 as it is formed. Note that in this embodiment, the size of the target optic can be smaller than the buffer layer to avoid edge artifacts, or the jig can be bigger. The margins of the target optic consequently remain useful for the desired application and trimming of the target optic is not necessary.

Figures 8A, 8B, 8C, 8D:
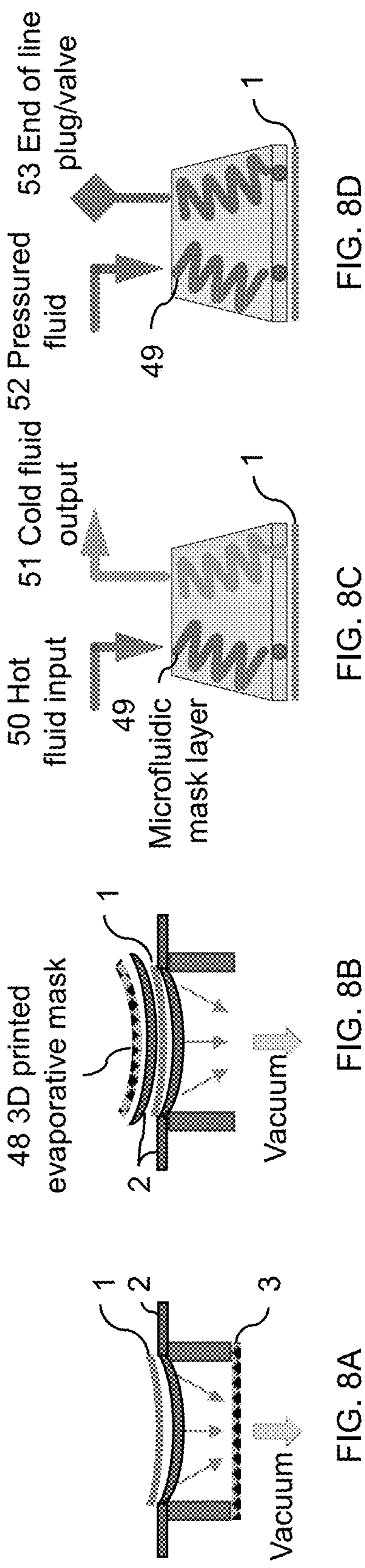
FIG. 8A through 8D illustrate a set of side views of example embodiments using contact-based masks without a mold for computational sagging and bulging, as in FIG. 3D.

In the embodiment in FIG. 8B, a jig 13 supports an extended buffer layer (2), which holds the target part layer 1. On top of the target part layer is another buffer layer 2 to keep the target part layer 1 clean. On top of the second buffer layer 2 there is a three-dimensionally printed evaporative or heat-evolving structure 48. The material is structured or corrugated to have different evaporation rates so that as the evaporation takes place, the stresses applied via weight or strains through local expansion and contraction of the material are transferred to the target part layer 1.

In the embodiment in FIG. 8C, the mask is a computationally determined set of microfluidic channels 49. Hot fluid 50 enters the channel and travels throughout the mask layer, cooling it in precomputed areas. Cold fluid 51 exits the channel and recirculates through the system. The temperature profile is thermally transferred to the target part layer 1.

FIG. 8D illustrates an embodiment in which the mask is a precomputed set of microfluidic channels 49 that a pressurized fluid enters 52. As it flows throughout the channels, the pressure varies according to the channel mask computation and produces local variations of stresses against the target part layer 1. A plug or valve 53 ends the channel.

Figure 9A:
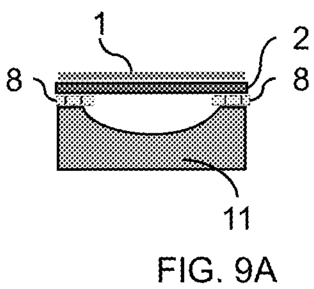
FIGS. 9A and 9B illustrate a set of side views of example embodiments of computational molds as described in FIG. 3E.
Figure 9B:
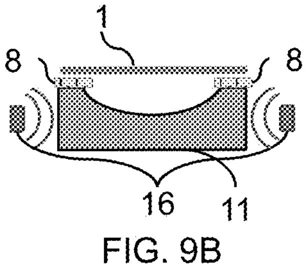

FIGS. 9A and 9B depict a pair of embodiments in which the mold itself is masked in a certain way, as described in FIG. 3E. In the embodiment in FIG. 9A, the target part layer 1 is supported by a buffer layer 8, which rests on the edges of the mold 11. The mold edges have variable friction surfaces 8 programmed onto them. As the target part layer 1 is pressed into the mold 11, the buffer layer 8 experiences varying friction that is precomputed using stress analysis. The variable stresses are induced into the target part layer 1.

In the embodiment in FIG. 9B the sides of the mold are patterned with a set of acoustic transducers 18. The transducers generate preprogrammed sound waves, or shear waves along the mold surface 11 to the target part layer 1. These waves interact with friction layers 8 to vary the friction profile spatially or temporally. In some embodiments, the transducers could be on inner mold surfaces to generate stresses or textural patterns along the axis of the mold 11 and target part layer 1. In some embodiments, a buffer layer or a plurality of buffer layers could be added for protection and support of the target part layer 1.

Figures 10A, 10B:
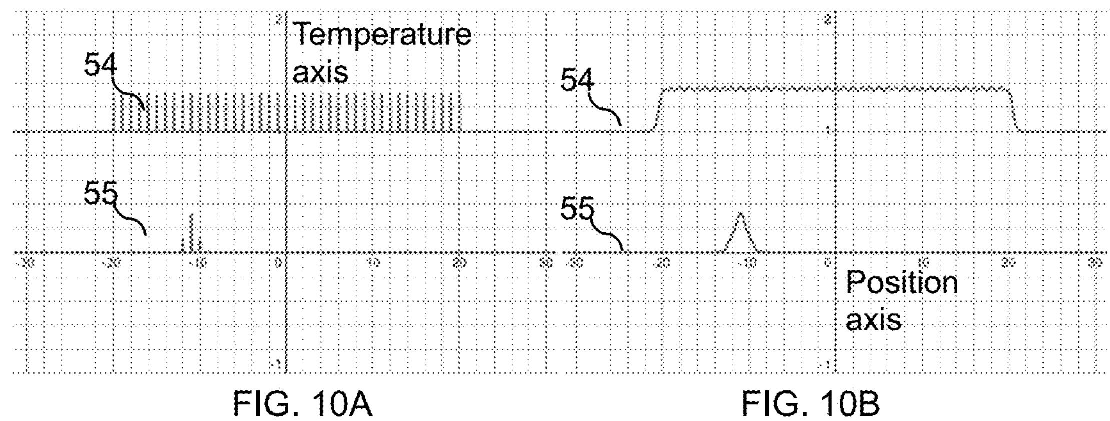
FIGS. 10A and 10B illustrate simulations of a generic heat source array, as compared to a broad heating element, and a formulation of a possible optimization problem.

An analysis of a heat mask is shown in FIGS. 10A and 10B. In FIG. 10A, the temperature profile of an array of 41 localized, equally spaced heat sources is plotted versus position at some initial time. This is a discretized model 54 of an extended source. A localized source profile 55 at some initial time is shown. FIG. 10B simulates both sources at a later time using the one-dimensional Green's function for the heat equation. Theoretically, the extended heat source changes the temperature uniformly 54, but fluctuations always result in distortions that cause errors in the precision of the target part layer. A localized heating source 55 can be programmed to produce local hot spots to compensate for any errors. The sum of the top and bottom temperature profiles, with the bottom profile being computationally preprogrammed based on heat flow analysis of the system, produces a temperature field for the target part layer to be formed with optical precision.

The heating mask profile can be formulated as an optimization problem. The goal of precision glass molding is to produce an ideal optic element with ideal surface S. Normally, wavefront errors are due to an uneven surface S*, which is caused by residual stresses during the thermal cycle. The goal of this invention is for S* to coincide with S as closely as possible. Define $D_{SS*}$ as the distance between the two surfaces. This measure could be, for example, room mean square (RMS) distance between pairs of surface points that lie along lines parallel to the optic axis. The goal is to minimize $D_{SS*}$.

If the time scale for heat flow is much shorter than the time scale of the thermal cycle of the thermoforming process, the heat equation simplifies to a boundary value problem of Laplace's equation with Dirichlet boundary conditions. One of the boundary surfaces, $b_0$, is the surface of a heat array, which can produce an arbitrary temperature pattern $T_j=T(x_j)$, where $x_j$ is the coordinate of a surface element. The mask profile is determined by choosing the $T_j$ values based on the optimization problem:

$\min\{D_{SS*}\}$, subject to $\nabla^2 T=0$, with $T_j=T(x_j)$ on $b_0$.

This could be solved, for example, by an iterative calculation starting with a prescribed boundary value on $b_0$ and adjusting the value so as to minimize the cost function.

FIGS. 11A through 11C depict a set of auxiliary embodiments. In the embodiment in FIG. 11A, the oven is positioned on a rotating stage that can rotated the mold 11, the target part layer 1, and other elements around three mutually perpendicular axes at variable rates $\Omega_1$, $\Omega_2$, and $\Omega_3$ 56. The result is a centrifugal-type mold that is not restricted to simple axial symmetry. Other embodiments of an oven can include use of arbitrarily engineered ferrofluids in the presence of magnetic fields as a computational mask, or the immersion of the target part layer and other components in a liquid.

In FIG. 11B, a precision oven using microwave components comprises an array of microwave heat sources 58 or a microwave mask 59 that are both computationally designed such that the combination produces a desired heating profile in the target layer 1. The target part layer 1 can be protected by a first or a second buffer layer 2 as it is pressed into a mold 18. The elements are all housed in a chamber 60. Other embodiments could be implemented with acoustic tweezers to that use ultrasonic or acoustic waves to pattern pressure waves and move objects dynamically.

FIG. 11C depicts a top view of an embodiment in which the target part layer 1 is pre-stressed with rods or wires 61 running through the layer. During the heating and cooling cycles, the rods experience different tensions forces applied to them 62, and the tension pattern is transferred to the target part layer 1. The wires could be parallel to each other, or they could be oriented in a two-dimensional pattern.

What is claimed is:

1. A manufacturing method comprising acts of:

coupling a heat source to a subsystem, wherein the subsystem comprises a mask;

coupling said subsystem to a target optic to be manufactured;

transferring a mask pattern from the mask to the target optic;

pressing the target optic into a mold; and generating a magnetic field with the heat source, and wherein the mask is an addressable magneto-caloric mask, wherein the mask is coupled to the heat source and the mask pattern is transferred to the target optic by non-contact radiation.

2. A manufacturing method comprising acts of:

coupling a heat source to a subsystem, wherein the subsystem comprises a mask;

coupling said subsystem to a target optic to be manufactured;

driving an alternating current to produce a mask pattern that is a heating pattern in a metallic slab, the heating pattern transferred radiatively to the target optic;

transferring a mask pattern from the mask to the target optic; and pressing the target optic into a mold, wherein the mask is coupled to the heat source and the mask pattern is transferred to the target optic by non-contact radiation.

3. A manufacturing method comprising acts of:

coupling a heat source to a subsystem, wherein the subsystem comprises a mask;

coupling said subsystem to a target optic to be manufactured;

transferring a mask pattern from the mask to the target optic;

pressing the target optic into a mold; and applying the mask to a portion of the mold, wherein the mask comprises an acoustic array, the method further comprising producing surface waves with the acoustic array that impact frictional forces between the mold and the target optic.

4. The manufacturing method of claim 3, further comprising protecting the target optic with at least a buffer layer.

* * * * *